(12) United States Patent
Culp et al.

(10) Patent No.: US 7,669,175 B2
(45) Date of Patent: Feb. 23, 2010

(54) METHODOLOGY TO IMPROVE TURNAROUND FOR INTEGRATED CIRCUIT DESIGN USING GEOMETRICAL HIERARCHY

(75) Inventors: James A. Culp, Newburgh, NY (US); Maharaj Mukherjee, Wappingers Falls, NY (US); Timothy G. Dunham, South Burlington, VT (US); Mark Lavin, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 11/747,485

(22) Filed: May 11, 2007

(65) Prior Publication Data

US 2008/0282211 A1 Nov. 13, 2008

(51) Int. Cl.
*G06F 17/50* (2006.01)
(52) U.S. Cl. .................. 716/21; 716/8; 716/9; 716/10; 716/11; 716/19; 716/20; 430/5; 430/30
(58) Field of Classification Search ............... 716/8–11, 716/19–21, 18; 430/5, 30
See application file for complete search history.

(56) References Cited

U.S. PATENT DOCUMENTS

| | | | |
|---|---|---|---|
| 4,812,962 A | 3/1989 | Witt | |
| 6,467,076 B1 | 10/2002 | Cobb | |
| 6,620,561 B2 * | 9/2003 | Winder et al. .................. | 430/5 |
| 6,928,634 B2 * | 8/2005 | Granik et al. .................. | 716/19 |
| 6,973,633 B2 | 12/2005 | Lippincott et al. | |
| 7,055,126 B2 | 5/2006 | Gallatin et al. | |
| 2004/0123265 A1 | 6/2004 | Andreev et al. | |
| 2004/0170905 A1 | 9/2004 | Liebmann et al. | |
| 2004/0221254 A1 | 11/2004 | Cobb | |
| 2004/0230930 A1 | 11/2004 | Lippincott et al. | |
| 2005/0055658 A1 | 3/2005 | Mukherjee et al. | |
| 2005/0091634 A1 * | 4/2005 | Gallatin et al. ................. | 716/21 |
| 2005/0094863 A1 | 5/2005 | Bergman et al. | |
| 2006/0075379 A1 | 4/2006 | Kamat | |
| 2006/0190850 A1 | 8/2006 | Kohle et al. | |
| 2007/0198967 A1 * | 8/2007 | Ren et al. ...................... | 716/21 |

* cited by examiner

*Primary Examiner*—Jack Chiang
*Assistant Examiner*—Nghia M Doan
(74) *Attorney, Agent, or Firm*—Wenjie Li; Todd M. C. Li

(57) ABSTRACT

A method of designing a layout for manufacturing an integrated circuit is provided, in which computationally intensive portions of the design process, such as simulation of an image transferred through a mask design, or simulation of electrical characteristics of a circuit, are performed more efficiently by only performing such computations on single instance of computational subunits that have an identical geometrical context. Thus, rather than performing such computations based on the functional layout, for which typical design process steps result in significant flattening of the functional hierarchy, and therefore increase the cost of computation, the invention performs simulations on computational subunits stored in a hierarchy based on geometrical context, which minimizes the cost of simulation. The resulting simulation results are subsequently assembled according to the functional layout.

8 Claims, 13 Drawing Sheets

METHODOLOGY TO IMPROVE TURNAROUND FOR INTEGRATED CIRCUIT DESIGN USING GEOMETRICAL HIERARCHY

TECHNICAL FIELD

The present invention relates in general to the design and manufacture of integrated circuits, and more particularly, to design methodologies that include simulation of circuits or lithographic processes.

BACKGROUND OF THE INVENTION

In the manufacture of integrated circuits, in particular, during the design of very-large-scale integrated (VLSI) circuits, the complexity of preparing and validating the effectiveness of circuit and mask layouts for many millions of devices on a single chip has resulted in simulation of those layouts as a critical component of design methodologies. However, the complexity and size of such simulations results in significant turnaround time.

For example, photolithography, or lithography, is typically used to transfer patterns relating to the layout of an integrated circuit onto a wafer substrate, including, but not limited to, materials such as silicon, silicon germainium (SiGe), silicon-on-insulator (SOI), or various combinations thereof. The drive to improve performance of VLSI circuits results in increasing requirements to decrease the size of features and increase the density of layouts. This in turn increasingly requires the use of resolution-enhancement techniques (RET) to extend the capabilities of optical lithographic processes. RET includes techniques such as the use of optical proximity correction (OPC), sub-resolution-assist-feature-enhanced lithography (SRAF) and phase-shifted-mask-enhanced lithography (PSM) or alternating phase-shift mask (altPSM) technology.

Among the several forms of Resolution Enhancement Techniques (RET), the iterative Model-Based Optical Proximity Correction (MBOPC) has established itself as a method of choice for compensation of the mask shapes for lithographic process effects. Conventional MBOPC tools work include the following steps in a manner similar to the following. An initial mask layout, typically based on the circuit design layout, is provided as input to the MBOPC tool. The shapes on the mask design (henceforth referred to as the mask) are typically defined as polygons. A pre-processing step is performed that discretizes (i.e. divides) the edges of each mask shape into smaller line segments. At the heart of the MBOPC tool is a simulator that simulates the image intensity at a particular points representing each of the line segments, which is typically at the center of each of the line segments. The OPC methodology, as embodied in an OPC tool, compares the simulated image to a desired target image to be printed on the wafer, and based on the deviation of the simulated image from the target image, the OPC tool causes the segments to be moved outward or inward from the feature interior, relative to their original position on the mask shape, to compensate for the deviation of the expected (simulated) image from the target image. This process is repeated iteratively, until, as a result of the modification of the mask shapes, the image intensity at these pre-selected points matches a threshold intensity level, within a tolerance limit.

While the quality of the OPC may improve as the number of segments increases, the efficiency of an MBOPC tool may decrease as the number of segments it simulates and iterates over in each iterative step increases. The number of segments in turn depends on the number of edges in each mask shape. In a typical mask there can be billions of shapes representing devices. Each shape can be divided into hundreds of segments. If all the segments are corrected independently, it may take some where between 150,000-250,000 CPU Hours to apply RET and OPC on a mask and use verification to detect its printability. Since both hardware and software cost depends on the total usage of CPU hours, in real dollar term this can be a significant expense.

In the current art this is made more efficient by taking advantage of the original or the designer imposed hierarchy which is also known as the native hierarchy of the design, which is a hierarchical representation of a layout based on functional reuse. In traditional representations of layouts there are a lot of circuits (such as a basic latch, de-capacitors) and combination of circuits (such as memory cells) that are used and reused again and again. This representation is known as the Hierarchic Tree in the design community, for example, circuit layout 110 in FIG. 1A. Though this is referred to as a tree, it is actually stored as Directed Acyclic Graph (DAG). Referring to FIG. 2, an example of a circuit layout 110 stored as a DAG is illustrated. C1 is a prime cell, which represents the entire layout of shapes for a given level of a circuit layout. C2 and C3 represent children of the prime cell C1. Stated another way, in this example, C1 consists of many repetitions of identical instances of two different cells C2 and C3, wherein an identical instance may include a rotation of the cell. Similarly, C2 consists of multiple repetitions or instances of child cells C4 and C5. C3 consists of multiple repetitions of children cells C6 and C7, and C4 consists of multiple instances of C8 and C9 and C5 and C6 consists of multiple instances of C10. In this example of a DAG 20, cells C7, C8, C9, and C10 are leaf nodes, which are nodes that do not have children of their own. Leaf nodes, such as cells C7, C8, C9 and C10, typically represent basic polygon shapes used as building blocks for devices, but typically do not themselves have functional significance. In typical circuit layouts, non-leaf nodes represent the combination of transistors or other devices, and combinations thereof, whose functions are repeated throughout the circuit layout. Each non-leaf node is known as a Cell. The root node C1 of the DAG is known as the Prime Cell, which represents the entire layout of a layer.

There are mainly two reasons why functional hierarchy is important for a circuit layout design. First, it helps the designers to reuse their design over and over again. Second it helps to make a design very compact. The use of a functional hierarchical design can save both memory and computation time, since computations, such as circuit or lithographic process simulations, need to be performed only once for each hierarchically stored cell and the computational results for a hierarchical cell may be applied to every instance of the cell that is repeated within the layout.

During the design process, some operations may cause the original hierarchy to be lost, which is referred to as a flattening of the hierarchy. For example, FIG. 3 illustrates a hierarchy tree 30 for a root node A (i.e. the prime cell in a DAG), including non-leaf nodes B, C, D, E, and multiple occurrences of leaf nodes "shape 1", "shape 2", "shape 3" and "shape 4" associated with certain non-leaf nodes A through E. Since each non-leaf cell B-E represents a repeated function within the root cell A, the characteristics of root cell A may be represented by computing the characteristics of a single occurrence of each non-leaf cell B-E, and assembling these characteristics according the hierarchy in order to obtain a representation of the root cell A.

However, an operation on the design that removes the repeated functional characteristics of the non-leaf nodes B, C, D and E within the root node A, will result in a flattened hierarchy tree 31 at the root node A, such that the non-leaf nodes for the tree rooted at that node A are removed, and stores all occurrences of the leaf node shapes of the leaf nodes in the flattened root node A'. In this example, the flattened hierarchy 31 now contains N occurrences of shape1, M occurrences of shape2, L occurrences of shape3 and K occurrences of shape4, where N, M, L and K are typically in the order of millions of occurrences.

Flattening increases computational and storage requirements because simulation of the characteristics of an individual non-leaf cell B-E can no longer be applied to represent the characteristics of the flattened root cell A'. Rather, all occurrences of the leaf cells, or shapes "shape1", "shape2", "shape3" and "shape4" must be provided within the layout of the flattened cell A', and computations, such as a simulation, must be performed on the entire flattened cell A' containing all occurrences of the leaf cells.

Flattening of the original or the native hierarchy may occur in both Rule-based and Model-based lithographic computation. In case of MBOPC, shapes in the region or vicinity of optical influence around the point of interest are used for computing the image intensity at the point of interest. The effective region of optical influence (ROI) is the region enclosed by a boundary that is at a distance beyond which a feature outside of that boundary in the layout does not have a substantial effect on the optical process of imaging a particular feature at the point of interest. Stated another way, features outside of the ROI boundary will have substantially insignificant effects, for practical purposes, on the optical process of imaging the particular feature around which the ROI is formed. For example, in a lithographic process with wavelength of light of 193 nm and NA=0.85, and the optical aperture of 0.75, the ROI can be 0.8-3 microns in length. The half of the ROI dimension is often referred to as the Optical Radius. In this example the Optical Radius varies from 0.4 micron to 1.5.

Now consider a shape at the boundary of a cell in the hierarchy tree. Its vicinity region may overlap two adjacent cells within the assembled or flattened layout. After OPC, a new shape may have been created, which is unique and can not be repeated anywhere in the hierarchy tree. This would mean that any further computation done on this shape may not be re-used. This contributes to a loss of hierarchy. If this happens for a number of shapes, the hierarchy may be flattened significantly.

We can also lose hierarchy in case of rules-based computations. For example, in case of the placement of both SRAF and altPSM, one needs to consider the space between two shapes. New mask shapes such as an SRAF or the phase shapes in altPSM are placed within the space between design shapes to be printed, depending on the configurations of these shapes. If the space being considered is between two design shapes to be printed are each from two different but adjacent cells, the newly created mask shapes may be unique again and may contribute to a loss of hierarchy within the mask layout.

The effect is further exacerbated by the application of strong RET methods that may comprise several RET methods applied in tandem. For example, in altPSM masks, phase regions and SRAFs may be applied in the trim mask, and the modified trim mask containing the SRAFs and phase shapes may then be further modified by MBOPC. In each stage of the application of a separate RET, the hierarchy may flatten further and the final design may not exhibit any hierarchy at all.

The conventional method of handling hierarchy in a mask design process, comprising data preparation (data prep) which may include OPC and verification, is shown in FIG. 1A. Flattening of the hierarchy may occur as a result of many of the operations performed on the mask design during data prep.

In Block 101, the hierarchy manager 100 starts with an input layout 110 having a defined functional or native hierarchy of cells. Optionally, RET (Block 101A) may be applied prior to data prep. The hierarchy manager 100 typically deals with one cell in the functional hierarchy at a time (102).

If a cell is smaller than a pre-specified size, it is merged with a neighboring cell (103). A neighboring cell is a cell that shares a geometric boundary with another cell. For example, referring to FIG. 1B, small cell 109 that is adjacent to a small neighboring cell 111 is merged to create a single cell 112 in Block 103. Note that the neighboring cells may not be residing within the same parent in the hierarchy tree. Therefore, after merging, the merged cell 112 needs to reside in a common ancestor within the hierarchy. Therefore merging two neighboring cells would typically require exploding or flattening up to the lowest common ancestor in Block 104.

Referring to FIG. 1C, a portion of the hierarchy tree 113 is illustrated, in which child cells C14 and C15 have a common ancestor cell C12, and child cells C16 and C17 have common ancestor cell C13. Cells C12 and C13 in turn have common ancestor cell C11. Here, two small neighboring cells C15 (109) and C16 (111) are merged (Block 103 in FIG. 1A) to form merged cell C18 (112). However, the neighboring cells C15 (109) and C16 (111) do not have a common ancestor. Therefore, the hierarchy is flattened to the lowest common ancestor cell. In this case, cell C11 is the lowest common ancestor for cells C14, C17 and merged cell C18 (112). Thus the non-leaf nodes C12 and C13 are removed from the hierarchy to form a new flattened hierarchy 114 in FIG. 1C comprising the common ancestor cell C11 having child cells C14, C17 and merged cell C18 (112).

If a cell is too large, it needs to be broken into several smaller cells. For example, cell 115 is larger than a predetermined size, and is split into smaller cells 116 (Block 105). This operation may increase the number of child cells at a given level of the hierarchy, but may not significantly impact the cost of computation.

Next, each cell in the hierarchy may be a candidate for a model-based operation, such as MBOPC or manufacturability rule verification, that requires a simulation of the image. Such a cell is typically associated with a band of ROI (106) prior to performing the simulation. For example, referring to FIG. 1D, cell 117 when placed within the flattened layout, has neighboring cells 117A, 117B and 117C. To simulate the image associated with an instance of a cell 117 when placed within the layout, an ROI 217 is formed around cell 117 based on its placement within the flattened layout, in which cell 117 has neighboring cells 117A, 117B and 117C. Similarly, each of the neighboring cells 117A, 117B and 117C would have an associated ROI 217A, 217B and 217C, respectively, as illustrated in FIG. 1E.

Referring to FIG. 1F, the resulting enlarged simulation cell 118 contains the original cell 117 and the ROI 217. Although the original cell 117 may be stored hierarchically, some instances of cell 117 may have an ROI 217 that includes shapes from different neighboring cells than other instances of cell 117 within the layout. For example, the cell 117B is another identical instance of cell 117, and thus may be stored as a single instance of cell 117, the ROI 217B associated with cell 117B contains different shapes from neighboring cells when placed in the geometric context of the flattened layout.

Thus some instances of cell 117 with its associated ROI 217, i.e. the enlarged simulation cell 118, would have a different optical context or region of optical influence than other instances of the enlarged simulation cell 118. Therefore, the larger simulation cells 118 and resulting images associated with cell 117 may no longer be able to be stored according to the original hierarchy for cell 117, and it may be necessary to explode or flatten the lowest common ancestor cell to accommodate the simulation cells that have different optical context regions, i.e. different ROI's.

Once the simulation cells and hierarchy are fixed in this manner, the shapes in the simulation cells are typically discretized or fragmented for simulation (Block 107). RET may be optionally be applied to the simulation cell, and RET shapes may be fragmented as necessary (Block 107). Since the application of RET may further alter the context region or ROI of each cell, further flattening of the layout may occur.

After application of OPC/RET, verification of manufacturability is performed on the OPC/RET processed cells (Block 108), which also includes simulation of the OPC/RET processed cells. Thus, any flattening of the hierarchy will result in longer turnaround times for the verification process. The results of OPC and RET is then output along with the verification results (Block 109). As discussed, current model-based design processes result in the flattening of the native or functional hierarchy several times. This flattening of the functional hierarchy decreases the efficiency of the computations and increases the memory requirements to store the data. As integrated circuits continue to evolve towards increased density and complexity, the design process will accordingly become more costly and difficult to perform efficiently.

Accordingly, it would be desirable to provide a method for improving the turnaround time for computationally intensive operations in the design process or tool for designing integrated circuits, such as lithographic mask design (e.g. MBOPC), mask manufacturability verification, or circuit design, while not reducing the quality or effectiveness of a computationally intensive design tool.

SUMMARY OF THE INVENTION

Accordingly it is an object of the present invention to provide a method for improving the computational efficiency of design tools, while maintaining the quality or effectiveness of a computationally intensive design tool.

To achieve this, the invention performs simulations on computational subunits stored in a hierarchy based on geometrical context, thus minimizes the cost of simulation. This is in contrast to the conventional method of performing simulations for cells stored according to the design functional hierarchy, which tends to be increasingly flattened during the design process steps. The present invention thus forms a separate hierarchy of computational subunits based on geometrical context for the purposes of simulation. The results of the simulation are then subsequently applied to the flattened functional layout after the computationally intensive work has been performed on the computational subunits stored according to the geometrical context hierarchy.

According to a first aspect of the invention, a method is provided for designing a layout for manufacturing an integrated circuit, the method comprising the steps of: providing a design layout including functional design shapes; discretizing said functional design shapes into a plurality of computational subunits; identifying a geometrical context region around each of said plurality of computational subunits; identifying a representative subunit of said plurality of computational subunits wherein said representative subunit represents a subset of said plurality of computational subunits each having essentially identical geometrical context regions; performing a computation for said representative subunit of said subset; and applying said computation to all occurrences of said representative subunit in said design layout.

In one embodiment of the present invention, the method may be incorporated into a design tool implemented in a digital computer. Alternatively, the method may be implemented as a computer program product stored on a computer readable medium comprising instructions for implementing the steps of the method. According to another alternative embodiment of the invention, the method could be offered as a business method on a subscription or fee basis. For example, the system and/or computer could be created, maintained, supported and/or deployed by a service provider that offers the functions described herein for customers. That is, a service provider could offer the functionality described above.

The foregoing and other features and advantages of the invention will be apparent from the following detailed description of the invention.

BRIEF DESCRIPTION OF THE DRAWINGS

Referring to the exemplary drawings wherein like elements are numbered alike in the several figures, in which.

DETAILED DESCRIPTION

Figure 1A:
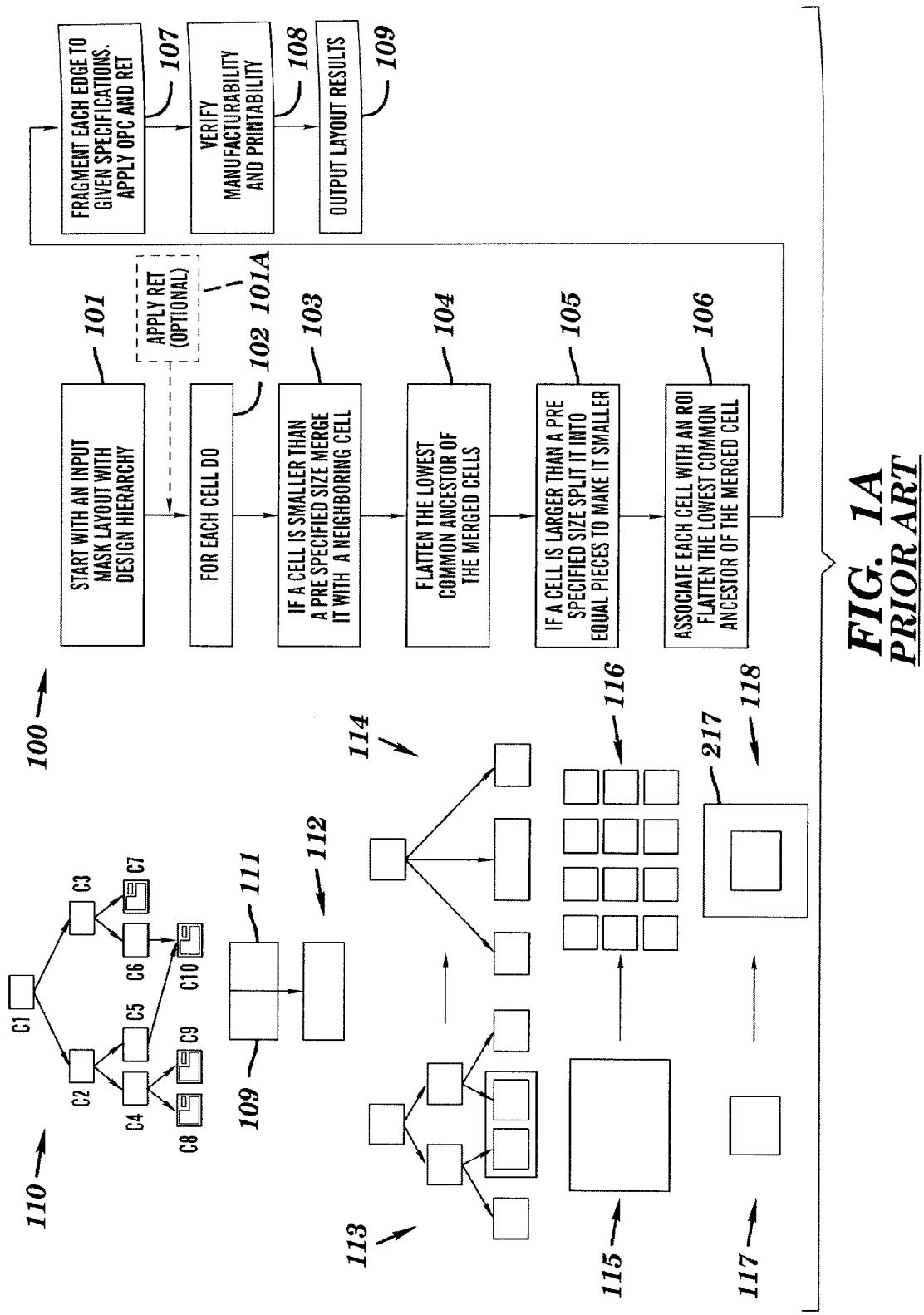
FIG. 1A illustrates a flow chart of a prior method of designing a mask layout.
Figure 1B:
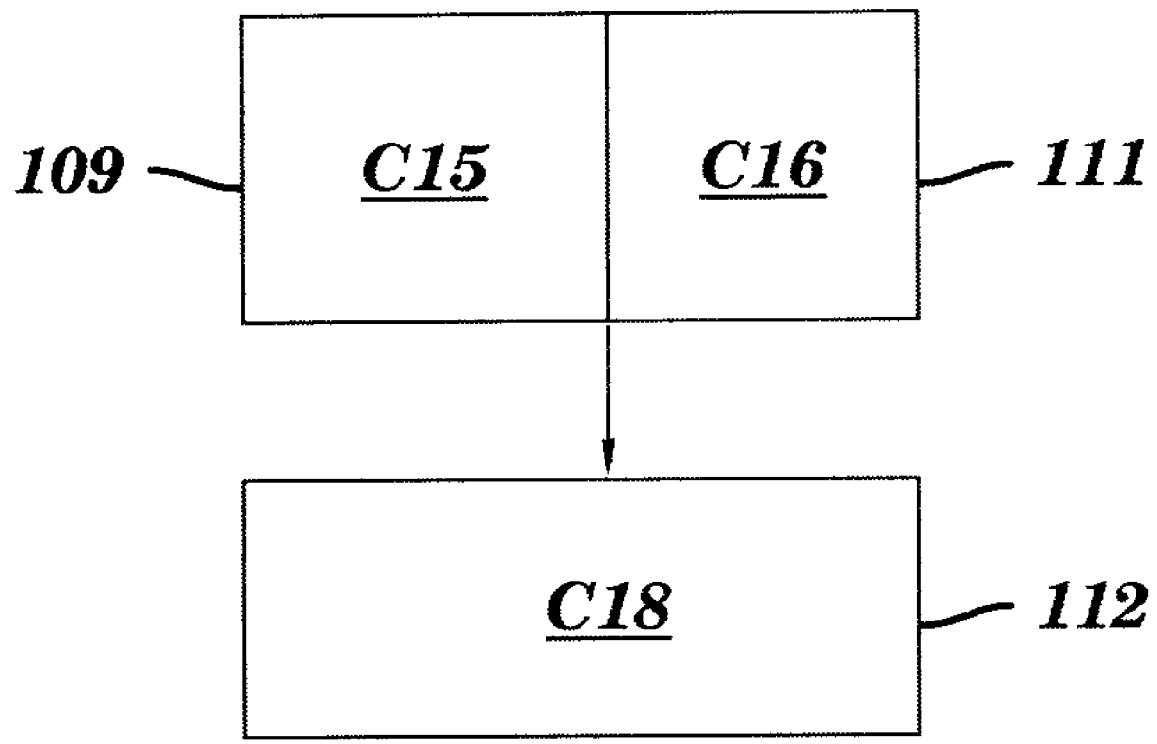
FIG. 1B illustrates a design operation of merging of two neighboring cells into a larger cell.
Figure 1C:
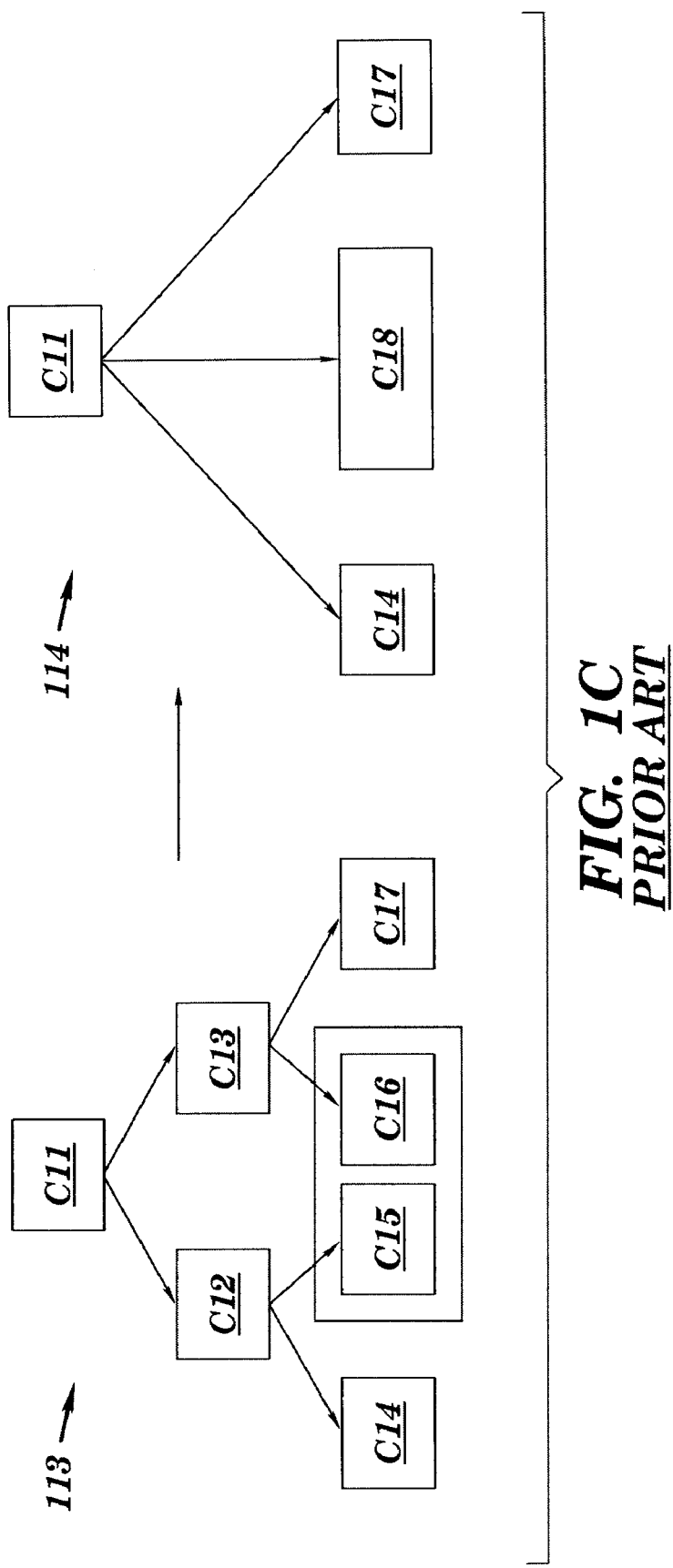
FIG. 1C illustrates the flattening of a functional hierarchy resulting from the merge operation of two neighboring cells, as in FIG. 1B.
Figure 1D:
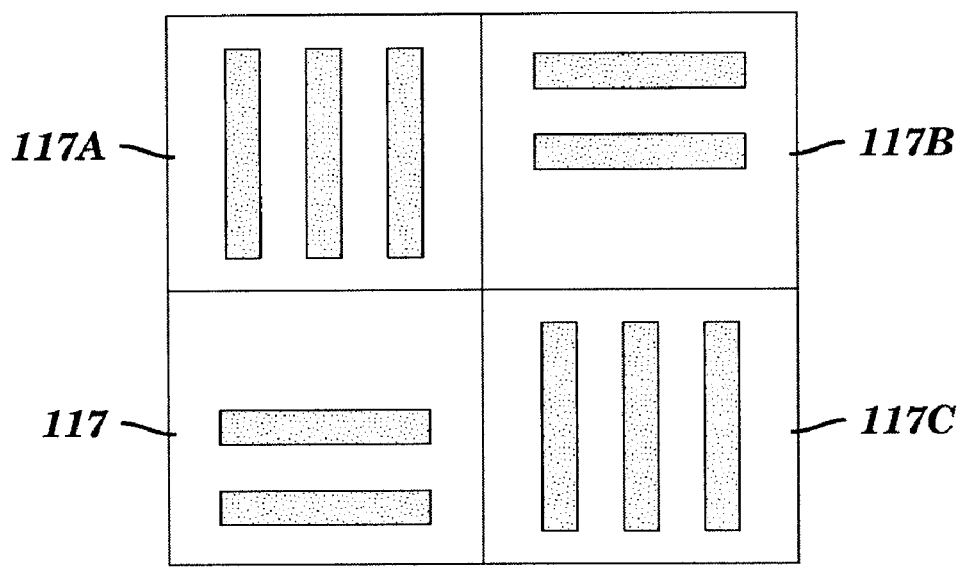
FIGS. 1D-1F illustrate a design operation of forming a simulation cell that includes a region of optical influence (ROI) that may result in flattening of the functional hierarchy.
Figure 1E:
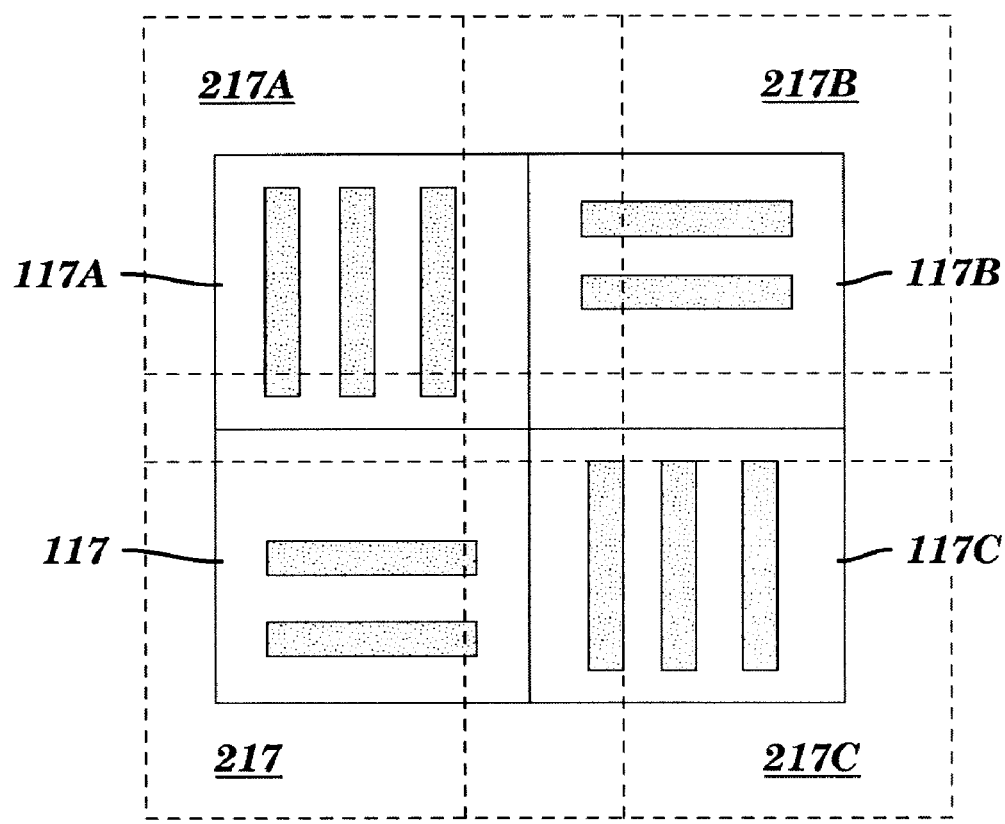
Figure 1F:
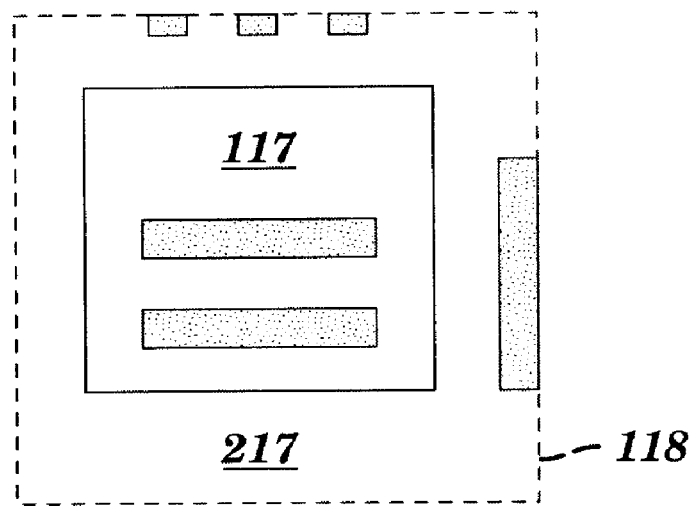
Figure 2:
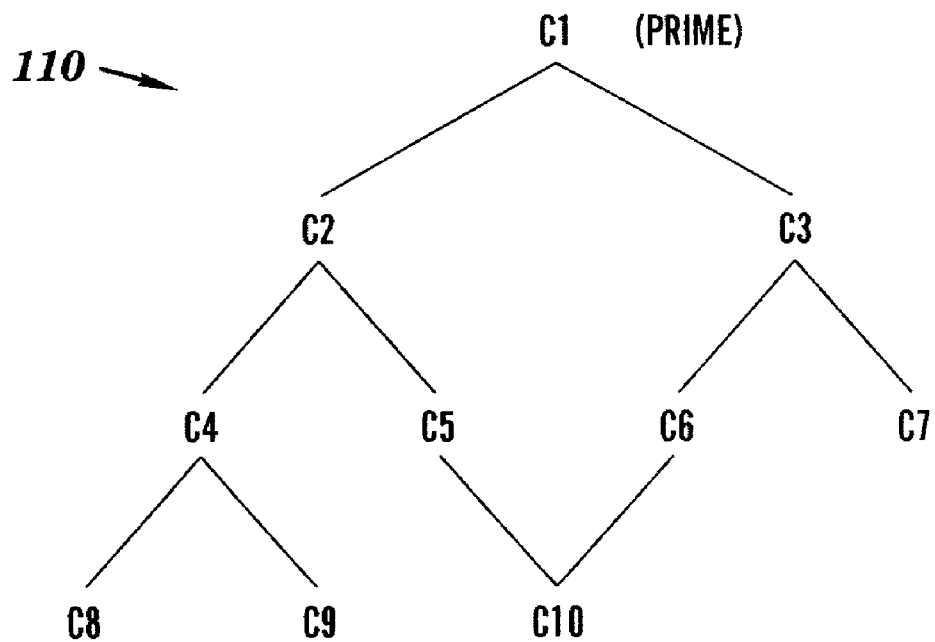
FIG. 2 illustrates an example of a directed acyclic graph.
Figure 3:
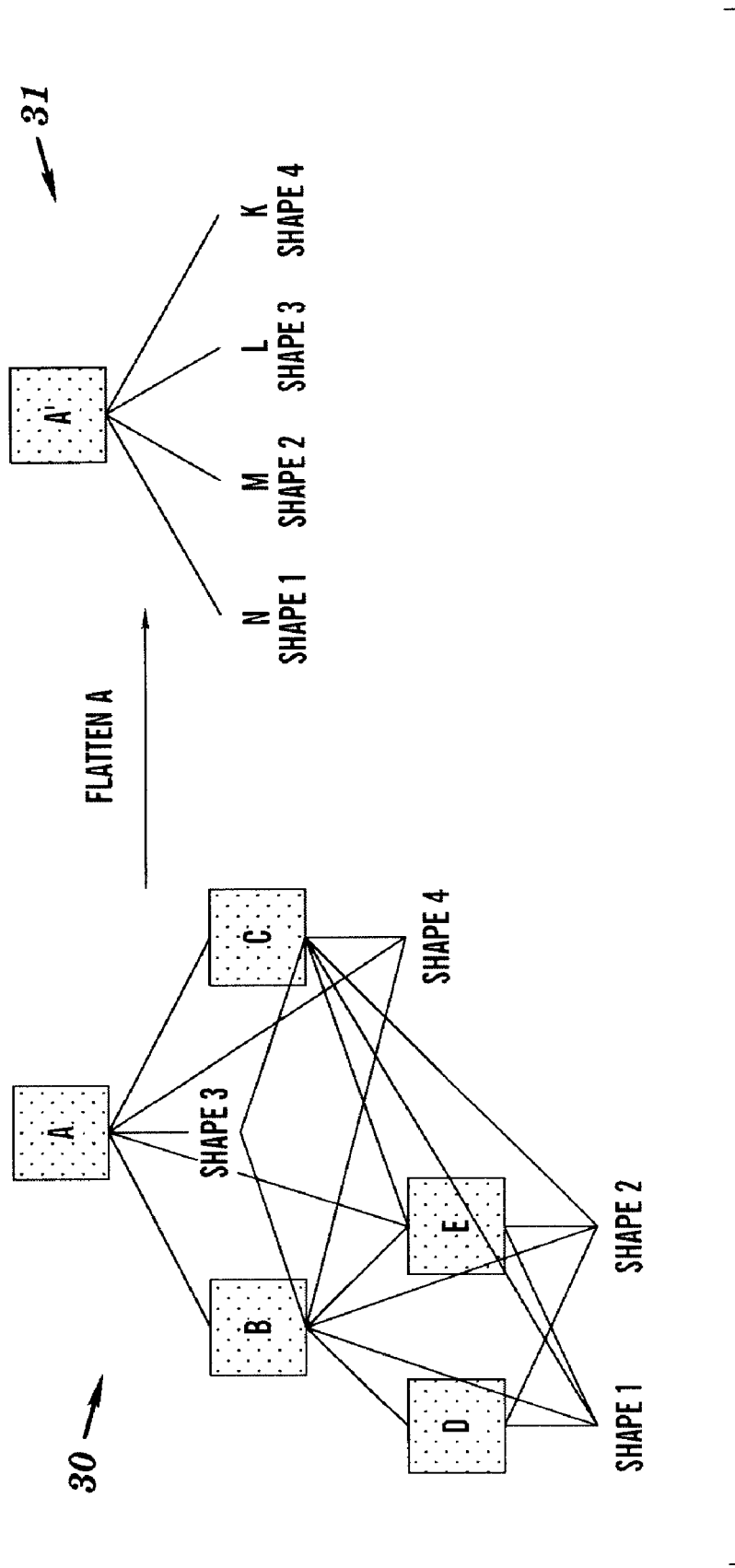
FIG. 3 illustrates an example of flattening of a hierarchical data set.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

An objective of the embodiments of the invention described herein is to provide a method and system by which shapes in a functional design layout, and stored in a functional hierarchy, are effectively re-arranged in a geometrical hierarchy to permit greater opportunities for hierarchical reuse in computations over the layout, such as lithographic process simulations or circuit simulations, as part of a circuit or mask design process.

An embodiment of a method for forming a geometric hierarchy in accordance with the present invention is described with reference to FIG. 4. An input design layout is provided (Block 1101), which would typically include shapes stored in a hierarchy based on the function of the shapes in the layout, as known in the art, referred to hereinafter as a functional hierarchy. The design shapes are discretized into subunits (Block 1103) for use in an appropriate computation, such as a simulation of a lithographic process, or a circuit simulation. For example, in simulations of a lithographic process, mask shapes are discretized into edge fragments, for which an image intensity may be computed at a point of interest representing each fragment. Computational subunits need not be limited to edge fragments, but could comprise any suitable computational subunit, such as a pixel. In another example, in circuit simulations, shapes representing, for example, metal lines and a diffusion layer which comprise a gate, may be discretized into finite elements for computing the capacitance of the gate.

Figure 5:
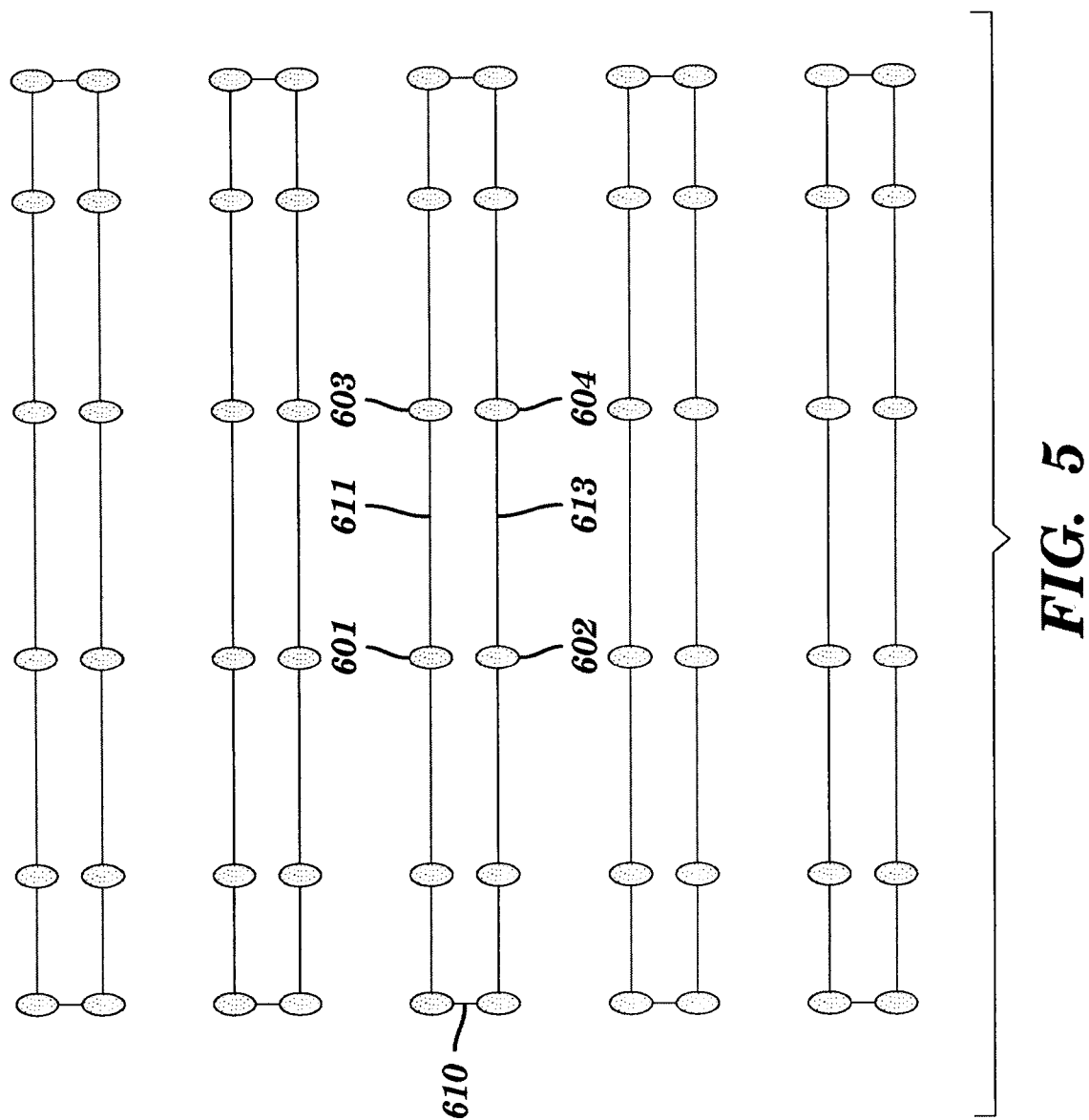
FIG. 5 illustrates mask design shapes having edge fragment computational subunits.

Next, for each computational subunit, a geometrical context region is identified around each subunit. For example, referring to FIG. 5, in the case of a lithographic mask layout having multiple instances of the same functional shapes, this may each be represented as a single cell in the functional hierarchy. Each of the shapes is discretized into edge fragments defined by nodes. Each edge fragment is a computation subunit for the purposes of lithographic image simulation for use in OPC or mask manufacturability verification. In this example, an edge fragment 611 of shape 610 is defined between two nodes 601, 603.

Figure 4:
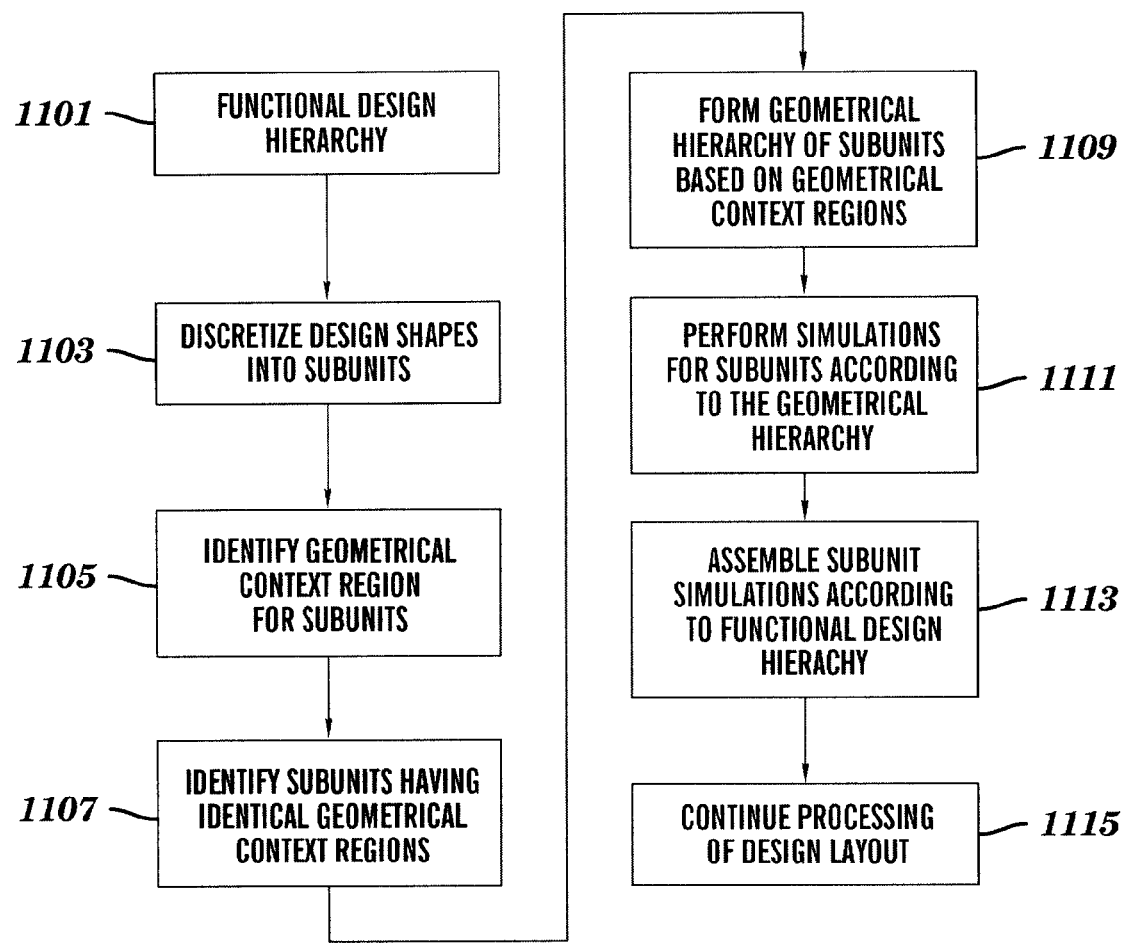
FIG. 4 illustrates a flow chart of an embodiment of a method for designing mask or circuit layout in accordance with the invention.
Figure 6:
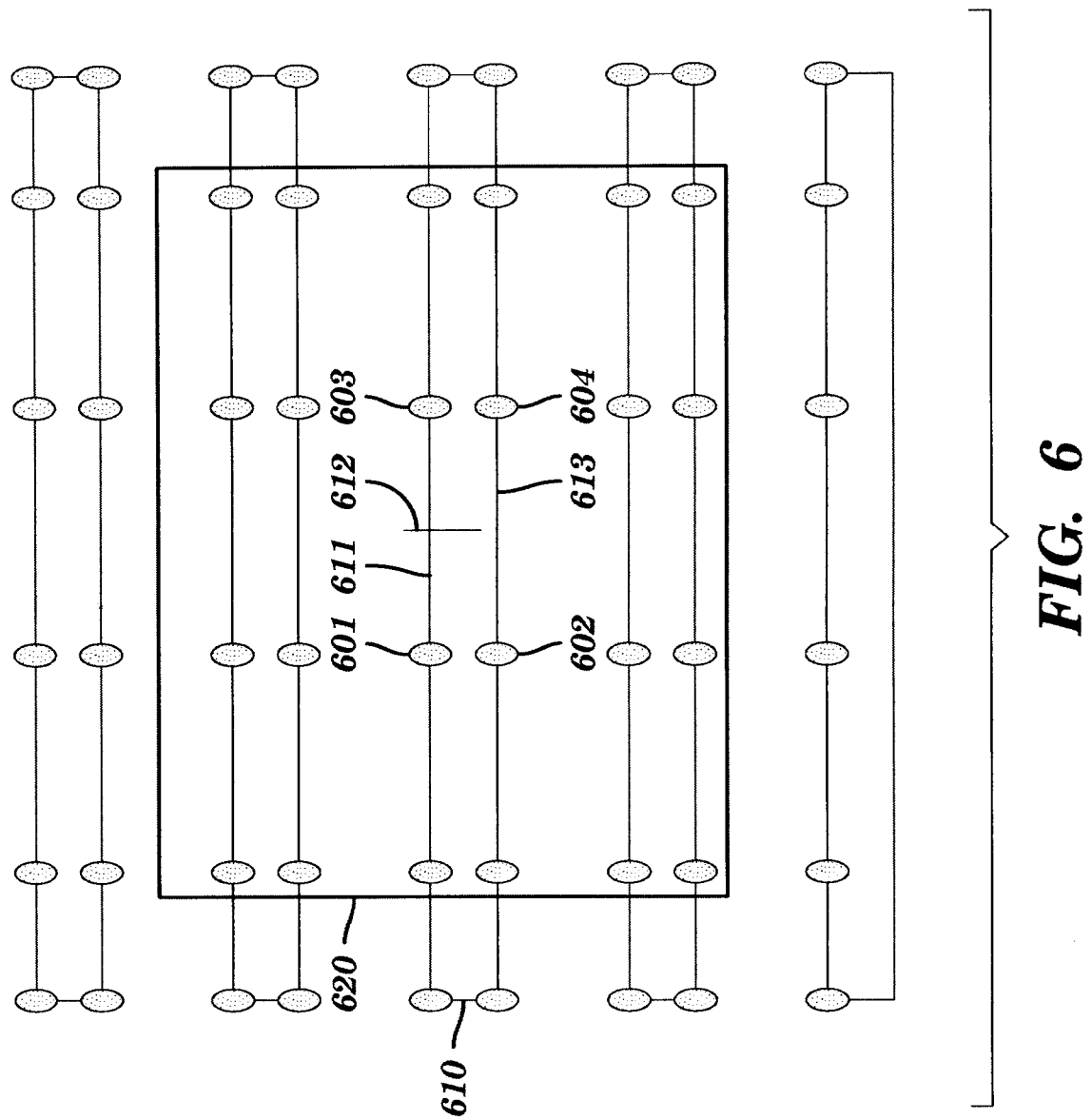
FIG. 6 illustrates a first edge fragment having a geometrical context region.

A geometrical context region of interaction or influence (ROI) is defined for each computational subunit, or edge fragment in the case of lithographic simulation (Block 1105 in FIG. 4). The ROI is the region within which neighboring computational subunits would significantly influence the simulation for the computational subunit of interest. Referring to FIG. 6, the ROI is defined around the point of interest that the fragment represents. In other words, the image intensity will be simulated at an evaluation point 612 that represents the fragment or computation subunit 611, and the ROI is defined around the evaluation point 612. The ROI may be defined in any suitable manner. Although nominally, an ROI may be defined as the region enclosing the radius of optical influence, typically, the ROI is defined as a rectangle 620 enclosing the radius of optical influence. Other methods for defining an ROI now known or developed in the future may be used.

Figure 7:
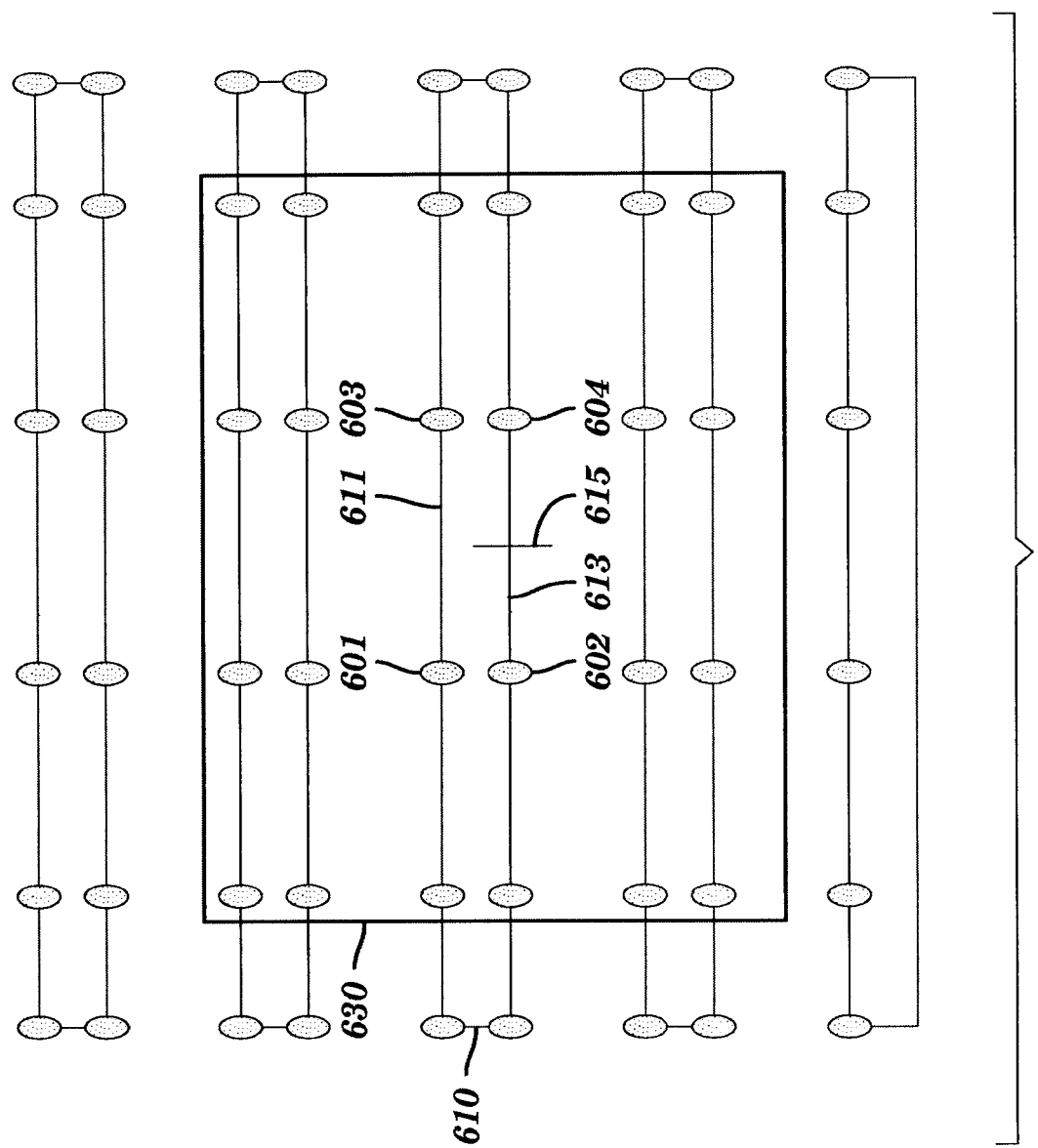
FIG. 7 illustrates a second edge fragment having an identical geometrical context region as the first edge fragment illustrated in FIG. 6.

Note that in this example, there is a fragment 613, defined between nodes 602, 604, that is located on the edge of shape 610 on an opposing side of shape 610 from fragment 611. The ROI 630 around edge fragment 613 contains shapes that are a mirror image of the shapes contained within ROI 620 around fragment 611, as illustrated in FIG. 7. Thus, both fragments 611 and 613 and their associated ROIs 620 and 630 have identical optical imaging characteristics, except for rotation. In accordance with the present invention, all such fragments or computational subunits that have identical regions of computational influence or geometrical ROIs are identified by pattern matching techniques known in the art, or any developed in the future (Block 1107 in FIG. 4).

Then, identical computational subunits are organized in a hierarchical tree based on the geometrical context regions or geometrical ROIs (Block 1109 in FIG. 4). Note that the native or functional hierarchical information is retained for subsequent processing. Then, simulations and corrections performed by the OPC tool may be performed for each computational subunit, e.g. a fragment plus its geometrical ROI, may be performed, and the results, including OPC corrections, for that fragment may be stored in the geometrical hierarchy (Block 1111). Note that the simulation results for the other fragments or shapes within the ROI need not be saved in the geometrical hierarchy.

Next, the resulting images and corrections may be assembled according to the functional hierarchy (Block 1113).

Figure 8A:
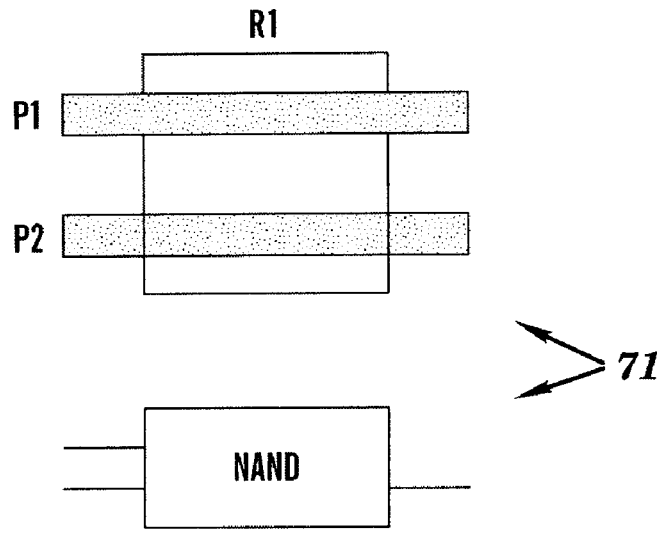
FIG. 8A illustrates shapes representing a NAND circuit device.
Figure 8B:
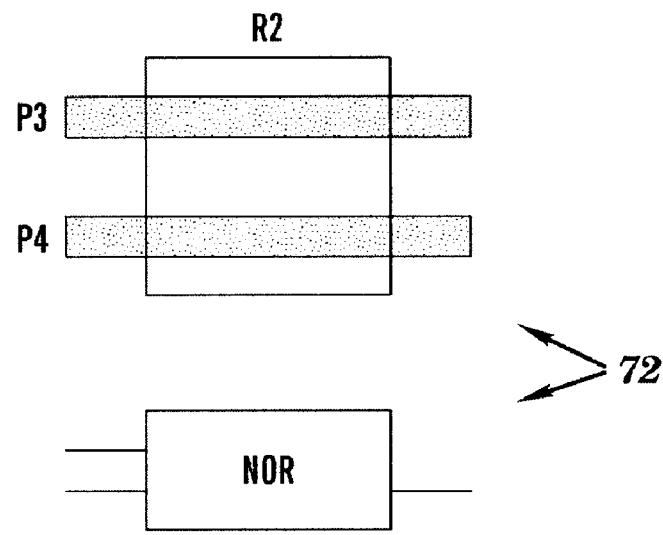
FIG. 8B illustrates shapes representing a NOR circuit device.
Figure 8C:
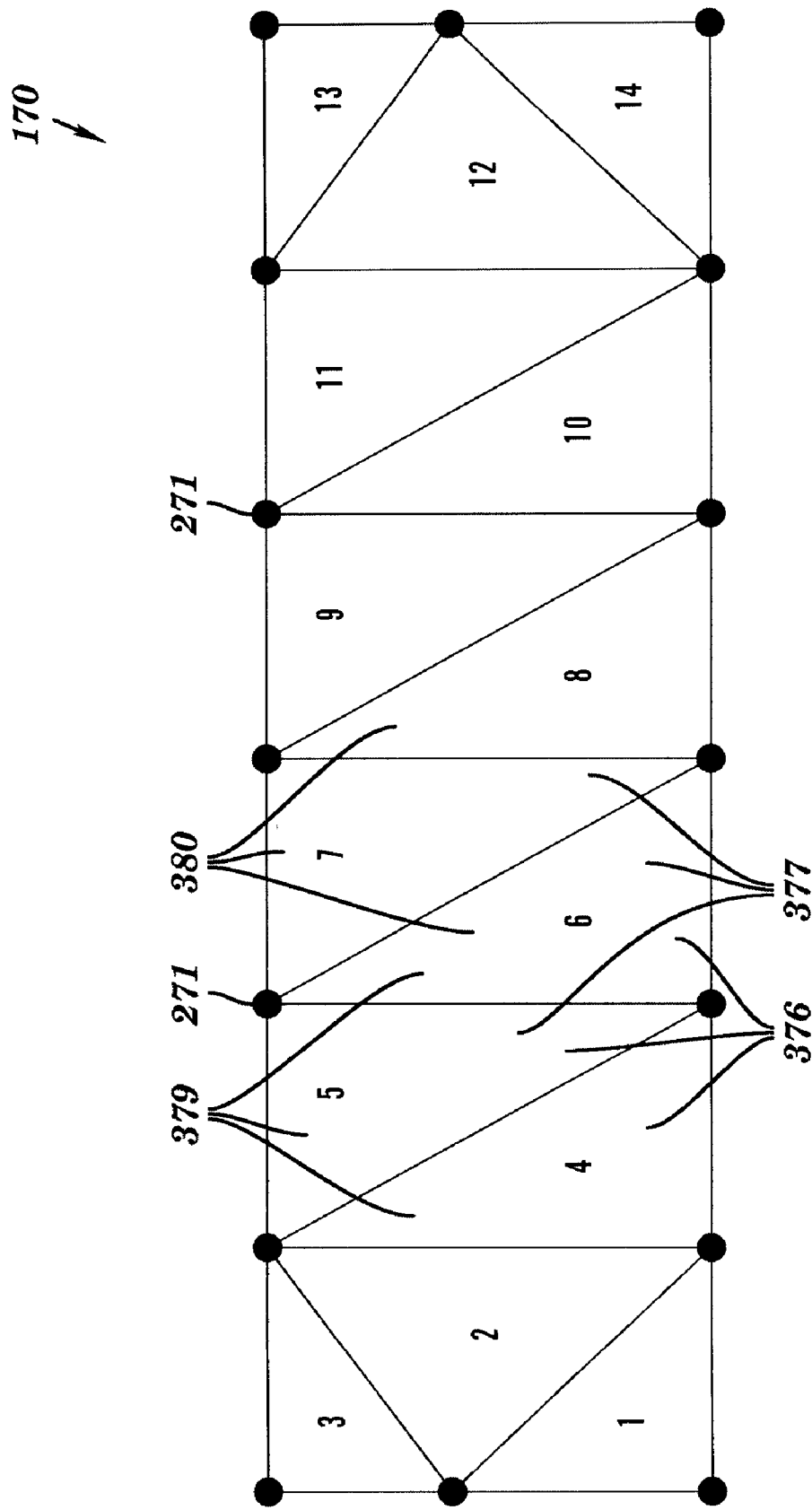
FIG. 8C illustrates a finite element representation of a line.

The use of a geometrical hierarchy of computational subunits, according to the invention, may also be applied to circuit design, where simulations are integrated into the design process. For example, a circuit design hierarchy may include leaf cells containing basic building blocks such as a NAND gate 71 (FIG. 8A) and a NOR gate 72 (FIG. 8B). The NAND gate 71 may be physically comprised of two metal lines P1, and P2 and a diffusion layer R1 on the wafer. The NOR gate 72 may be physically comprised of two metal lines P3, and P4 and a diffusion layer R2. Assume that the metal lines P1, P2, P3, P4 all have the same size and dimensions. During the circuit design process, it may be desirable to compute the parasitic capacitance of each of the metal lines P1, P2, P3 and P4. For example, a typical method of computing the parasitic capacitance of a line 170 involves discretizing the line 170 into finite elements, as illustrated in FIG. 8C. In this example, the line 170 is discretized into triangular elements having vertices defined by nodes 271. The parasitic capacitance for the line 170 will be approximated by solving Maxwell's equations within each of the finite elements. In addition, the edge-adjacent finite elements also need to be considered. For example, to determine the capacitance within triangle 2, one needs to consider triangles 1, 3 and 4 and solve the Maxwell's equation in all of them.

Notice that the grouping 379 of triangle 5 with adjacent triangles 4 and 6 is equivalent to the grouping 380 of triangle 7 with adjacent triangles 6 and 8, for computational purposes, since the group 379 is a translated version of the group 380. Also note that by the mirror image symmetry, the grouping 376 of triangle 5 with adjacent triangles 4 and 6 is also equivalent to the grouping 377 of triangle 6 with adjacent triangles 5 and 7. Thus, considering translation and mirror-image symmetry we have the following equivalence groups {1,3,13,14} {2,12} {4,11} {5,6,7,8,9,10}. Hence, by storing groups of finite elements having equivalent computational symmetry in a geometric hierarchy, and solving Maxwell's equations only for unique groups in the geometric hierarchy, the parasitic capacitance for the line 170, comprising 14 triangles and their adjacencies, may be obtained from solving Maxwell's equations for only 4 computational groups.

The simulations for the individual computational subunits, which have been stored according to the geometrical hierarchy based on identical geometrical context regions, may be assembled in accordance with the functional design hierarchy (i.e. on a flattened data set) (Block 1113). Further processing of the flattened layout may be performed (Block 1115), such as performing optical proximity correction based on a simulation of an optical image transferred through a lithographic mask, or manufacturability verification of the mask based on a simulation of the optical image, or in the case of the simulation of electrical characteristics of a circuit layout, tuning or optimization of the performance may be performed based on the simulation results. Any combination of the foregoing steps may be repeated as required during the design of the layout, but may be performed more rapidly, since the computationally intensive simulations are being performed only once for each computational subunit having identical geometrical context regions, rather than on the larger, flattened data sets.

Figure 9:
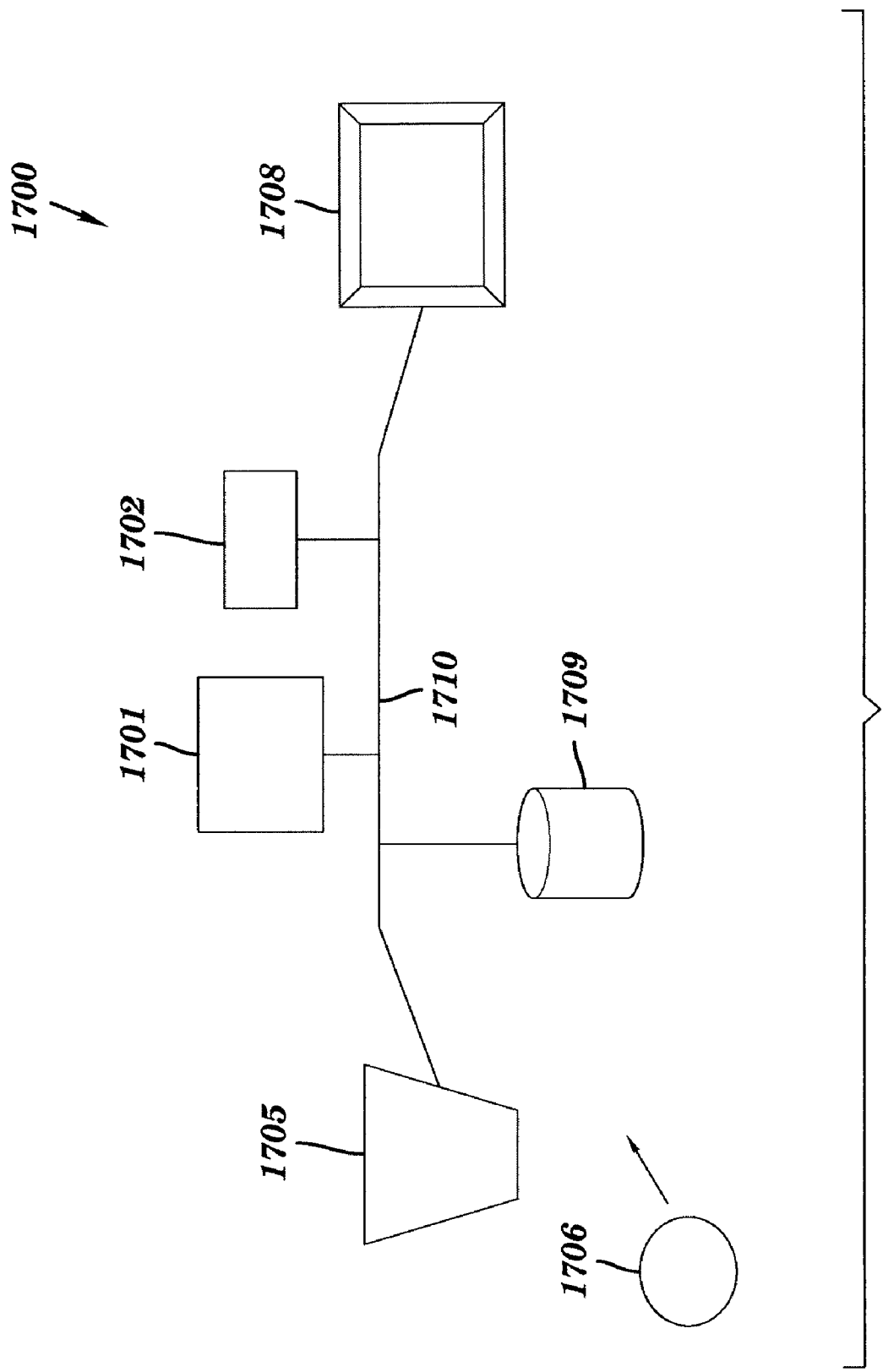
FIG. 9 illustrates a computer system and program product for performing the method according to another embodiment of the invention.

In one embodiment of the present invention, referring to FIG. 9, the geometrical hierarchy may be incorporated into a design tool implemented in a digital computer 1700, having components including, but not limited to: a central processing unit (CPU) 1701, at least one input/output (I/O) device 1705 (such as a keyboard, a mouse, a compact disk (CD) drive, and the like), a display device 1708, a storage device 1709 capable of reading and/or writing computer readable code, and a memory 1702, all of which are connected, e.g., by a bus or a communications network 1710. The present invention may be implemented as a computer program product stored on a computer readable medium, such as a tape or CD 1706, which may be, for example, read by the I/O device 1705, and stored in the storage device 1709 and/or the memory 1702. The computer program product contains instructions to implement the method according to the present invention on a digital computer. The invention can take the form of an entirely hardware embodiment, and entirely software embodiment or an embodiment containing both hardware and software elements. In a preferred embodiment, the invention is implemented in software, which includes, but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus, device or element that can contain, store, communicate, propagate, or transport the program for use by or in connection with the computer or instruction execution system. The medium can be an electronic, magnetic, optical, electromagnetic, infrared, or semiconductor storage medium, network or propagation medium. Examples of a storage medium include a semiconductor memory, fixed storage disk, moveable floppy disk, magnetic tape, and an optical disk. Current examples of optical disks include compact disk-read only memory (CD-ROM), compact disk-read/write (CD-R/W) and digital video disk (DVD). The present invention may also be implemented in a plurality of such a computer or instruction execution system where the present items may reside in close physical proximity or distributed over a large geographic region and connected by a communications network, communicating through a propagation medium via communication devices, such as network adapters. Examples of a network include the Internet, intranet, and local area networks. Examples of a propagation medium include wires, optical fibers, and wireless transmissions. Examples of network adapters include modems, cable modems, ethernet cards and wireless routers.

It is understood that the order of the above-described steps is only illustrative. To this extent, one or more steps can be performed in parallel, in a different order, at a remote time, etc. Further, one or more of the steps may not be performed in various embodiments of the invention.

It is understood that the present invention can be realized in hardware, software, a propagated signal, or any combination thereof, and may be compartmentalized other than as shown. Any kind of computer/server system(s)—or other apparatus adapted for carrying out the methods described herein—is suitable. A typical combination of hardware and software could be a general purpose computer system with a computer program that, when loaded and executed, carries out the respective methods described herein. Alternatively, a specific use computer, containing specialized hardware for carrying out one or more of the functional tasks of the invention could be utilized. The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. Furthermore, it should be appreciated that the teachings of the present invention could be offered as a business method on a subscription or fee basis. For example, the system and/or computer could be created, maintained, supported and/or deployed by a service provider that offers the functions described herein for customers. That is, a service provider could offer the functionality described above.

While the present invention has been particularly described, in conjunction with a specific preferred embodiment, it is evident that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method for designing a layout for manufacturing an integrated circuit, the method implemented in a computer, said method comprising the steps of:
    providing a design layout comprising a layout of an integrated circuit, said design layout including functional design shapes;
    discretizing said functional design shapes into a plurality of computational subunits, said computation units comprising finite elements of said functional shapes;
    identifying a geometrical context region around each of said plurality of computational subunits;
    identifying a representative subunit of said plurality of computational subunits wherein said representative subunit represents a subset of said plurality of computational subunits each subunit of said subset having essentially identical geometrical context regions;
    performing a computation for said representative subunit of said subset, said computation comprising simulation of an electrical characteristic of said integrated circuit;
    applying said computation to all occurrences of said representative subunit in said design layout, and
    storing said applied computation in a computer memory.

2. The method of claim 1, wherein said functional design shapes are provided according to a functional hierarchy arrangement in said computer memory.

3. The method of claim 1, wherein a plurality of said representative are identified and stored in said computer memory according to a geometrical hierarchy based on said geometrical context regions.

4. The method of claim 1, further comprising performing tuning of performance of said integrated circuit based on said simulation.

5. A computer program product comprising a computer storage device having a computer readable program embodied in said storage device for designing a layout for manufacturing an integrated circuit, wherein the computer readable program when executed on a computer causes the computer to perform the method steps of:

provide a design layout comprising a layout of an integrated circuit, said design layout including functional design shapes;

discretizing said functional design shapes into a plurality of computational subunits, said computation units comprising finite elements of said functional shapes;

identifying a geometrical context region around each of said plurality of computational subunits;

identifying a representative subunit of said plurality of computational subunits wherein said representative subunit represents a subset of said plurality of computational subunits each subunit of said subset having essentially identical geometrical context regions;

performing a computation for said representative subunit of said subset, said computation comprising simulation of an electrical characteristic of said integrated circuit;

applying said computation to all occurrences of said representative subunit in said design layout, and storing said applied computation in a computer memory.

6. The computer program product of claim 5, wherein said functional design shapes are provided according to a functional hierarchy arrangement in said computer memory.

7. The computer program product of claim 5, wherein a plurality of said representative subunits are identified and provided according to a geometrical hierarchy based on said geometrical context regions arrangement in said computer memory.

8. The computer program product of claim 5, said method steps further comprising performing tuning of performance of said integrated circuit based on said simulation.

* * * * *